United States Patent Office 3,404,194
Patented Oct. 1, 1968

3,404,194
METHOD FOR CONVERTING ETHYLENE TO HIGHER MOLECULAR WEIGHT HYDROCARBONS
Donald L. Crain and Robert E. Reusser, Bartlesville, Okla., assignors to Phillips Petroleum Company, a corporation of Delaware
No Drawing. Filed Apr. 30, 1965, Ser. No. 452,337
7 Claims. (Cl. 260—683.15)

ABSTRACT OF THE DISCLOSURE

Organomagnesium halide compounds obtained by heating an ether solution of an organomagnesium halide to drive off the ether are mixed with an organolithium compound to form a catalyst which is used for converting ethylene to higher hydrocarbons, principally 1-olefins.

This invention relates to a method for converting ethylene to higher molecular weight hydrocarbons. In one aspect, this invention relates to a catalyst for converting ethylene to higher molecular weight hydrocarbons. In another aspect, this invention relates to a method for preparing a catalyst.

Heretofore, the use of organomagnesium halides either alone or in combination with certain metal halides has been suggested for the polymerization of certain olefins to solid polymers.

Quite surprisingly, it has been found that certain organomagnesium halide products when mixed with an organolithium compound form a catalyst effective for the conversion of ethylene to higher hydrocarbons, principally 1-olefins containing from 4 to 24, preferably from 4 to 20, carbon atoms per molecule.

It has also been found that in order to produce the catalyst system of this invention the organomagnesium halide must be heated at an elevated temperature before mixing with the organolithium compound or compounds.

The catalyst of this invention thus brings together that which is obtained upon heating at least one organomagnesium halide at an elvated temperature, and at least one organolithium compound.

Accordingly, it is an object of this invention to provide a new and improved method for converting ethylene to higher hydrocarbons. It is another object of this invention to provide a new method for forming a catalyst for the conversion of ethylene to higher hydrocarbons. It is another object of this invention to provide a new catalyst.

Other aspects, objects and the several advantages of the invention will be apparent to those skilled in the art from the description and the appended claims.

According to this invention, ethylene is converted to higher 1-olefins by contacting same with an effective catalytic amount of a catalyst which is formed by mixing at least one organolithium compound with the material obtained upon heating at least one organomagnesium halide to a temperature of at least 150° C., preferably at least 175° C. The organolithium compounds of this invention are represented by the formula RLi and the organomagnesium halides are represented by the formula RMgX. In both of these formulas each R is selected from the group consisting of alkyl, aryl, cycloalkyl and combinations thereof such as alkaryl and aralkyl, containing from 1 to 8 (3 to 8 in the case of cyclic hydrocarbons and 6 to 8 in the case of aromatic hydrocarbons) carbon atoms, inclusive. Each R is preferably selected from the group consisting of alkyl, cycloalkyl, and combinations thereof containing from 2 to 6 (3 to 6 in the case of cycloalkyls) carbon atoms, inclusive. Also, X is a halide, preferably selected from the group consisting of chlorine, bromine and iodine.

Examples of the organomagnesium halide compounds which can be employed in this invention include methylmagnesium bromide, ethylmagnesium bromide, ethylmagnesium chloride, n-propyl-magnesium iodide, propylmagnesium chloride, sec butylmagnesium fluoride, phenylmagnesium chloride, n-heptylmagnesium chloride, n-octylmagnesium bromide, benzylmagnesium iodide, (2-methylphenyl)magnesium fluoride, (4 - ethylphenyl)magnesium chloride, (phenylmethyl)magnesium fluoride, (2-phenylethyl)magnesium bromide, cyclopropylmagnesium bromide, cyclobutylmagnesium chloride, cyclohexylmagnesium iodide, (4 - ethylcyclohexyl)magnesium chloride, cyclooctylmagnesium bromide, and the like.

Examples of the organolithium compounds of this invention include methyllithium, ethyllithium, propyllithium, isopropyllithium, n - hexyllithium, n - octyllithium, phenyllithium, benzyllithium, 4-ethylphenyllithium, 2-methylphenyllithium, 2-phenylethyllithium, phenylmethyllithium, cyclopropyllithium, cyclobutyllithium, cyclohexyllithium, 2-ethylcyclohexyllithium, cyclooctyllithium, and the like.

Examples of catalyst systems which can be employed in this invention include ethylmagnesium chloride-ethyllithium, propylmagnesium bromide - cyclohexyllithium, benzylmagnesium iodide - isooctylmagnesium iodide-methyllithium, n-butyl lithium or tert butyl lithium, each combined with any one of methyl or ethyl or phenyl magnesium bromide or chloride, and the like.

One component of the catalyst of this invention is preferably prepared by heating the organomagnesium halide in the zone in which the ethylene is subsequently to be passed to a temperature of at least 150° C. While the maximum temperature of heating will vary over a wide operable range depending upon the specific organomagnesium metal halide group present, the temperature will generally range from about 150 to about 250° C. or even higher. The heating time can vary from a few minutes to several days, usually less than one day, and preferably from about 0.5 to about 10 hours. Although the organomagnesium metal halide can be heated per se, it is preferably heated in the form of a solution. The preferred solvents are hydrocarbon solvents such as are enumerated for the contacting with the RLi compound, and can contain minor amounts of an ether type solvent such as ether, dioxane, tetrahydrofuran, and the like. During the heating of the organomagnesium metal halide solution, the solvent, if present, is preferably substantially completely driven off.

The product obtained on heating the organomagnesium metal halide compound is then contacted, preferably by mixing, with the organolithium compound, said contacting preferably being effected in the presence of an inert diluent. The diluent can be at least one hydrocarbon selected from the group consisting of paraffins, cycloparaffins and aromatics each having from 5 to 12 (6 to 12 in the case of cycloparaffins and aromatics) carbon atoms per molecule, inclusive. Suitable diluents include benzene, cyclohexane, n-pentane, isooctane, naphtha, decalin, naphthalene, n-dodecane, and the like, and mixtures of these materials.

The contacting of the product of the RMgX compound with the organolithium compound is preferably carried out at a temperature of at least 0° C. and preferably from about 0° C. to about 200° C. or even higher. The period of time of contacting or mixing can vary from two minutes to several days, preferably from about 0.5 to 5 hours.

The mol ratio of the organolithium compound to the organomagnesium halide compound before the thermal treating step of the latter compound can vary over a wide operable range, but will generally be from about 5/1 to about 1/5. The total amount of catalyst employed in the conversion of the ethylene can also vary over a wide range but will generally be from about 0.1 to about 10 weight percent based on the ethylene. A primary requirement is that an effective catalytic amount of the catalyst be present relative to the amount of ethylene present and when a diluent is employed in the conversion of the ethylene the amount of catalyst will generally range from about 0.5 to about 20 weight percent of the diluent present.

The contacting of the ethylene with the catalyst will generally range from about 150 to about 350° C., preferably about 175 to about 300° C. The pressure can vary over a wide operable range but will generally be from about 100 to about 5000 p.s.i.g. at the reaction temperature. The reaction time will generally range from two minutes to three days, preferably from about one to about ten hours.

The ethylene conversion process and the catalyst preparation process of this invention are amenable to both batch and continuous techniques and the separation of the higher 1-olefin product can be effected by conventional means such as distillation, solvent extraction, crystallization, and the like.

The olefins produced by this invention can be used as intermediates in the preparation of long-chain alcohols, amines, and the like, and can be used in the alkylation of aromatics to form alkylated aromatics suitable for sulfonation to form biodegradable detergents.

Dried n-pentane in the amount of 150 milliliters was added to a 1000-milliliter autoclave, after which 50 milliliters of a 3 molar ether solution of ethylmagnesium bromide was added. The reactor was sealed and heated at 200° C. after which it was vented to a Dry Ice trap. The reactor was maintained at 200° C. for 3 hours with an inert atmosphere of nitrogen flowing therethrough. After this time the nitrogen flow was terminated and the reactor allowed to cool to ambient temperature. Next, 300 milliliters of benzene and 5 milliliters of hexene-1 (for subsequent use as a chromatographic analysis aid) were added to the reactor. Ethylene was then pressured into the reactor to 700 p.s.i.g. at 25° C. The contents of the reactor were then heated to 200° C. at which temperature the pressure was 2150 p.s.i.g. The pressure fell rapidly to 1950 p.s.i.g. after which a leak was detected in the manifold system of the reactor. The temperature was maintained at 200° C. for 5 hours and the pressure dropped thereafter to 1850 p.s.i.g., thereby indicating by the 100 p.s.i.g., drop a small consumption of ethylene. The reactor was then cooled to 25° C. at which temperature the pressure was 600 p.s.i.g. The reactor was opened and was found to contain 2 grams of material formed from the ethylene. Gas-liquid chromatographic analysis on a 20-foot polyphenyl ether column programmed from 75 to 250° C. indicated that the 2 grams of product consisted of solid polymer and $C_{10}$, $C_{12}$, $C_{14}$ and $C_{16}$ olefins in approximately equivalent amounts.

Thus, it was shown that ethylmagnesium bromide per se did not significantly convert ethylene to higher 1-olefins.

Example I

Pentane in the amount of 150 milliliters and 50 milliliters of a 3 molar ether solution of ethylmagnesium bromide was charged to a 1000-milliliter autoclave under a nitrogen atmosphere. The reactor was heated to 200° C., vented, maintained at 200 to 230° C. for 1.5 hours, pressured to 500 p.s.i.g. with nitrogen and allowed to cool to ambient temperatures. Dried benzene in the amount of 300 milliliters was then charged to the reactor along with 100 milliliters of a 1.61 molar solution of n-butyllithium in hexane and 5.0 milliliters of hexene-1 (for subsequent use as a chromatographic analysis aid). The reactor was then pressured with ethylene and heated to 200° C. At 130° C., some venting was necessary since the pressure had risen to 2400 p.s.i.g. After the temperature of the reactor contents reached 200° C., the pressure started to drop and during the first hour it rapidly dropped from 2400 p.s.i.g. at 204° C. to 1700 p.s.i.g. at substantially the same temperature and then continued to drop more slowly. The run was continued for 9.5 hours during which time the pressure fell to 1200 p.s.i.g. The heating was then terminated and the reactor allowed to cool to ambient temperature. The catalyst was then deactivated by adding 15 milliliters of water and the reactor was found to contain primarily liquid polymer. The total yield of product in the reactor was 58.5 grams of which 48.5 grams was liquid polymer and 10 grams was solid polymer. Gas-liquid chromatographic analysis on a 20-foot polyphenyl ether column programmed from 75 to 250° C. of the product indicated that 10.3 grams of butene, 17.0 grams of hexene-1 (over and above the 5 milliliters of hexene-1 added as an analysis aid), 6.0 grams of decene-1, 4.9 grams of dodecene, 3.2 grams of tetradecene, 3.3 grams of hexadecene and 2.8 grams of octadecene were formed. Octenes were formed but the presence of benzene interfered with the quantitative determination of octenes in this analysis.

By this example it is shown that the product formed on heating ethylmagnesium bromide when combined with n-butyllithium effected a significant conversion of ethylene to 1-olefins.

Reasonable variations and modifications are possible within the scope of this disclosure without departing from the spirit and scope thereof.

We claim:
1. A method for converting ethylene to higher hydrocarbons containing from 4 to 24 carbon atoms per molecule, inclusive, comprising contacting ethylene under reaction conditions with an effective catalytic amount of a catalyst consisting essentially of that formed by mixing an organolithium compound represented by the formula RLi and an ether free organomagnesium halide represented by the formula RMgX wherein each R is selected from the group consisting of alkyl, aryl, alkaryl, aralkyl, cycloalkyl and combinations thereof containing from 1 to 8 carbon atoms, inclusive, and X is one of chlorine, bromine, and iodine, said ether free organomagnesium halide having been obtained by heating an ether solution of the compound at a temperature of at least 150° C. for a time sufficient to substantially completely drive off the ether.

2. The method according to claim 1 wherein both the contacting of the organolithium compound with the organomagnesium halide and the contacting of the ethylene with the catalyst is conducted in the presence of hydrocarbon diluent.

3. A method for converting ethylene to higher hydrocarbons containing from 4 to 24 carbon atoms per molecule, inclusive, comprising contacting ethylene under reaction conditions with an effective catalytic amount of a catalyst consisting essentially of that formed by mixing at a temperature of from about 0 to about 200° C. an organolithium compound represented by the formula RLi and an ether free organomagnesium halide represented by the formula RMgX wherein each R is selected from the group consisting of alkyl, cycloalkyl and combinations thereof containing from 2 to 6 carbon atoms, inclusive, and X is selected from the group consisting of chlorine, bromine, and iodine, said ether free organomagnesium halide having been formed by heating an ether solution of the halide at a temperature of from about 150° to about 250° C. for a time sufficient to substantially completely drive off the ether.

4. The method according to claim 3 wherein the ethylene contacting is carried out in the presence of a hydrocarbon diluent and said catalyst is present in the range of from about 0.5 to about 20 weight percent of the diluent product.

5. A method for converting ethylene to higher 1-olefins containing from 4 to 24 carbon atoms per molecule, inclusive, comprising contacting ethylene with an effective catalytic amount of a catalyst consisting essentially of that formed by mixing butyllithium with ether free ethylmagnesium bromide obtained by heating ethylmagnesium bromide in an ether solution at a temperature of at least 175° C. for a time sufficient to substantially completely drive off the ether, said contacting of said ethylene being carried out at a temperature in the range of from about 150° to about 350° C. and in the presence of at least one hydrocarbon solvent selected from the group consisting of paraffins, cycloparaffins and aromatics having from 5 to 12 carbon atoms per molecule, inclusive, the mole ratio of butyllithium to ethylmagnesium bromide in the ether solution being from about 5/1 to about 1/5.

6. A method for converting ethylene to higher 1-olefins containing from 4 to 24 carbon atoms per molecule, inclusive, comprising contacting ethylene with an effective catalytic amount of a catalyst consisting essentially of that formed by mixing propyllithium with ether free ethylmagnesium chloride obtained by heating ethylmagnesium chloride in an ether solution at a temperature of at least 175° C. for a time sufficient to substantially completely drive off the ether, said contacting of said ethylene being carried out at a temperature in the range of from about 150 to about 350° C. and in the presence of at least one hydrocarbon solvent selected from the group consisting of paraffins, cycloparaffins and aromatics having from 5 to 12 carbon atoms per molecule, inclusive, the mole ratio of propyllithium to ethylmagnesium chloride in the ether solution being from about 5/1 to about 1/5.

7. A method for converting ethylene to higher 1-olefins containing from 4 to 24 carbon atoms per molecule, inclusive, comprising contacting ethylene with a catalyst consisting essentially of that formed by mixing n-butyllithium with ether free propylmagnesium chloride obtained by heating propylmagnesium chloride in an ether solution at a temperature of at least 175° C. for a time sufficient to substantially completely drive off the ether, said contacting of said ethylene being carried out at a temperature in the range of from about 150° to about 350° C. and in the presence of at least one hydrocarbon solvent selected from the group consisting of paraffins, cycloparaffins and aromatics having from 5 to 12 carbon atoms per molecule, inclusive, the mole ratio of the n-butyllithium to propylmagnesium chloride in the ether solution being from about 5/1 to 1/5, the amount of catalyst employed being from about 0.1 to about 10 weight percent based on the ethylene.

References Cited

UNITED STATES PATENTS

| | | |
|---|---|---|
| 2,575,520 | 7/1949 | Roedel. |
| 3,082,264 | 3/1963 | West et al. _ _ _ _ _ _ 252—431 X |
| 3,231,515 | 1/1966 | Ziegler et al. _ _ _ _ _ _ 252—431 X |
| 3,264,360 | 8/1966 | Nudenberg et al. _ _ _ _ 260—665 |

OTHER REFERENCES

Ziegler et al., Ber. Deut. Chem. 64 (1931), pp. 448–452.
Walborsky et al., J. Amer. Chem. Soc. 86 (1964), p. 3295.

PAUL M. COUGHLAN, JR., *Primary Examiner.*